(12) United States Patent
Flynn (10) Patent No.: US 8,352,819 B2
(45) Date of Patent: Jan. 8, 2013

(54) STATE RETENTION USING A VARIABLE RETENTION VOLTAGE

(75) Inventor: David Walter Flynn, Cambridge (GB)

(73) Assignee: ARM Limited, Cambridge (GB)

(*) Notice: Subject to any disclaimer, the term of this patent is extended or adjusted under 35 U.S.C. 154(b) by 918 days.

(21) Appl. No.: 12/385,674

(22) Filed: Apr. 15, 2009

(65) Prior Publication Data
US 2010/0269004 A1 Oct. 21, 2010

(51) Int. Cl.
*H03M 13/00* (2006.01)
(52) U.S. Cl. ........................................ 714/746
(58) Field of Classification Search .............. 714/15, 714/16, 20, 23, 30–32, 41, 45, 726, 745, 714/746, 768, 774, 799
See application file for complete search history.

(56) References Cited

U.S. PATENT DOCUMENTS

| | | | |
|---|---|---|---|
| 6,378,108 B1 | 4/2002 | Schoellkopf | |
| 6,870,412 B2* | 3/2005 | Cho | 327/202 |
| 7,171,605 B2* | 1/2007 | White | 714/763 |
| 7,269,780 B2* | 9/2007 | Arima et al. | 714/764 |
| 7,310,755 B2 | 12/2007 | Mudge et al. | |
| 7,332,949 B2* | 2/2008 | Kim | 327/202 |
| 7,827,427 B2* | 11/2010 | Lee et al. | 713/323 |
| 7,941,683 B2* | 5/2011 | Branover et al. | 713/323 |
| 8,042,022 B2* | 10/2011 | Ito et al. | 714/764 |
| 2004/0153762 A1 | 8/2004 | Flynn et al. | |
| 2009/0261871 A1* | 10/2009 | Lu | 327/143 |
| 2009/0326854 A1* | 12/2009 | Chakravadhanula et al. | 702/119 |

OTHER PUBLICATIONS

U.S. Appl. No. 13/067,395, filed May 27, 2011, Flynn.
U.S. Appl. No. 13/067,396, filed May 27, 2011, Idgunji et al.
SOCcentral, "Designing for State Retention", *Online*—printed Mar. 2011, 4 pages.
Kim et al., "Experimental Measurement of a Novel Power Gating Structure with Intermediate Power Saving Mode", *ISPLED '04*, Aug. 2004, pp. 20-25.
Henzler et al., "Dynamic State-Retention Flip-Flop for Fine-Grained Power Gating with Small Design and Power Overhead", *IEEE Journal of Solid-State Circuits*, vol. 41, No. 7, Jul. 2006, pp. 1654-1661.
Austin et al., "Low Power Robust Computing—Tutorial", Nov. 2004, 173 pages.
ARM DevCon Panel Discussion, "Shaken or Stirred by Low Power Design Challenges?", *ARM Synopsys*, 2007, 63 pages.
Chung et al., "On-Demand Solution to Minimize I-Cache Leakage Energy with Maintaining Performance", *IEEE Transactions on Computers*, vol. 57, No. 1, Jan. 2008, pp. 7-24.
Idgunji, "Case Study of a Low Power MTCMOS based ARM926 SoC: Design, Analysis and Test Challenges", *International Test Conference*, Lecture 2.3, 2007, pp. 1-10.
Calhoun et al., "Standby Power Reduction Using Dynamic Voltage Scaling and Canary Flip-Flop Structures", *IEEE Journal of Solid-State Circuits*, vol. 39, No. 9, Sep. 2004, pp. 1504-1511.
Goering, "Low Power Design"—Special Technology Report, *SCD Source*, Sep. 2008, Issue 1, pp. 1-17.
United Kingdom Search Report dated Jul. 20, 2012 in GB 1205295.7.
Office Action mailed Sep. 14, 2012 in co-pending U.S. Appl. No. 13/067,396.

* cited by examiner

*Primary Examiner* — Nadeem Iqbal
(74) *Attorney, Agent, or Firm* — Nixon & Vanderhye P.C.

(57) ABSTRACT

A data processing apparatus is provided with state retention circuits into which state values are saved from nodes within the data processing circuitry when entering a sleep mode from an active mode. Error management circuitry is coupled to the state retention circuits and detects errors in the retention of the state values. If errors are detected then an error recover response is triggered. A voltage controller coupled to the error management circuitry serves to vary a supply voltage to the state retention circuits during the sleep mode so as to maintain a finite non-zero error rate in the retention of the state values by the state retention circuits.

22 Claims, 9 Drawing Sheets

FIG. 10

STATE RETENTION USING A VARIABLE RETENTION VOLTAGE

TECHNICAL FIELD

The technical field relates to the field of data processing systems, and the technology described relates to data processing systems having an active state in which processing operations are performed and a sleep state in which state data is retained while processing operations are suspended.

BACKGROUND

It is known to provide data processing systems with an active state and a sleep state. In the active state normal data processing operations are performed and normal supply voltage levels are used. When data processing operations are no longer required it is known to place the data processing apparatus into a sleep state. Within this sleep state various portions of the data processing apparatus may be powered down, or operated at different/reduced voltage levels in order to reduce the power consumption. In order to provide a rapid exit from the sleep state it is known to provide state retention circuits which store state values during the sleep mode such that the state values are locally available upon exiting the sleep mode so that processing may quickly resume within the active mode. One form of such state retention circuits are termed "balloon latches". These balloon latches may be provided with their own supply voltage and formed so as to have characteristics desirable in lowering power consumption during the sleep mode (e.g. low leakage current).

As process geometries for forming integrated circuits become increasingly small (e.g. 35 nm and below), these circuits become increasingly vulnerable to soft errors, such as are caused by ionizing radiation. In order to increase resistance to such soft errors, it is normal to provide a generous margin in the supply voltage level to state retention circuits over the minimum required in order to increase their resistance to soft errors and the like. However, these generous margins in the supply voltage levels to the state retention circuits adversely increase the power consumption during sleep mode, such as by increasing leakage current.

SUMMARY

Viewed from one aspect, an apparatus for processing data comprises:
data processing circuitry configured to perform data processing operations;
at plurality of state retention circuits coupled to said data processing circuitry to capture and restore respective state values from and to respective nodes within said data processing circuitry;
a mode controller coupled data processing circuitry and said plurality of state retention circuits to switch said apparatus between an active mode in which said data processing circuitry performs data processing operations and a sleep mode in which said data processing circuitry does not perform data processing operations and said plurality of state retention circuits store said state values captured from said data processing circuitry upon entering said sleep mode, said mode controller controlling said data processing circuitry and said plurality of state retention circuits such that upon exiting said sleep mode and returning to said active mode said state values are restored under hardware control to said respective nodes before data processing by said data processing circuitry is resumed;

error management circuitry coupled to said plurality of state retention circuits and configured to detect one or more errors in retention of said state values and to trigger an error recovery response when said one or more errors are detected; and
a voltage controller coupled to said error management circuitry and configured to vary one or more supply voltage levels to said plurality of state retention circuits during said sleep mode so as to maintain a finite non-zero error rate in said retention of said state values.

A voltage controller actively varies the one or more supply voltage levels to the state retention circuits. Error management circuitry coupled to the state retention circuits detects errors in the retention of the state values by the state retention circuits and triggers an error recovery response when such errors are detected. When such error management is in place, an advantageous reduction in power consumption during the sleep mode can be achieved by adjusting the one or more supply voltage levels in order to maintain a finite non-zero error rate in the retention of the state values. The control used deliberately seeks to maintain the one or more supply voltage levels at value(s) which cause errors in the retention of the state values. The power saved by operating at a level where a finite non-zero error rate is maintained more than compensates for the extra power consumed by the error recovery response and the resources needed to provide this error recovery response.

In some embodiments the error management circuitry may serve to generate one or more error detection codes from the state values stored in the plurality of state retention circuits.

The error detection codes may be generated upon switching from the active mode to the sleep mode and the error management circuitry may use the error detection codes to detect errors in the retention of the state values when switching from sleep mode to the active mode.

As well as detecting errors when switching from the sleep mode to the active mode, some embodiments may use the error detection codes to detect errors in the retention of the state values while remaining in the sleep mode. Periodically checking the state values for errors while remaining in the sleep mode may serve to prevent an unrecoverable build up of errors as a few errors may be within the capability of the error recovery response to repair while a larger number of errors may be outside of this capability.

The error management circuitry may in some embodiments generate one or more error correction codes from the state values stored in this state retention circuits and the error recovery response may use these error correction codes to correct errors that are detected. It is possible that the error recovery response and the correction of errors may be done other than by the use of error correction codes, but error correction codes are well suited to rapid correction of errors in a manner that facilitates a rapid switch from a sleep mode to an active mode even if errors are detected.

The error recovery response may include detecting when the errors in the state value stored are unrecoverable and in this circumstance triggering a fall-back response.

The fall-back response can take a variety of different forms. In some embodiments upon entering the sleep mode the mode controller can trigger storage of the state values to a memory (separate from the state retention circuits) with this memory being read as part of the fall-back response in order to restore the state values if an unrecoverable error within the state values stored within the state retention circuits is detected. The storage of the state values to the memory and the reading of the state values back from the memory may be performed under software control as while this may be a lower speed option the likely frequency at which it is invoked is low and accordingly the overhead associated with providing hardware support for this activity would not be justified.

Another form of fall-back response may be an at least partial reset of the apparatus. Depending upon the nature of the data processing apparatus it may be that an at least partial reset provides a reliable way of restoring correct operation even if it will delay resumption of the active mode in which data processing is performed.

The switching between the active mode and the sleep mode can be triggered in a variety of different ways. In some embodiments a wait-for-interrupt signal and a wake interrupt signal may be used to trigger this switching.

The state retention circuits may take a variety of different forms (e.g. such as the balloon latches previously discussed). However, in many real life systems there are already provided within the system scan chain cells that form a portion of a diagnostic mechanisms (e.g. used for manufacturing test and/or design debugging) and these can be reused to provide the state retention circuits used in accordance with the present technique. The nodes within a system which are targeted for manufacturing test and/or debugging are typically the nodes which store important state values and accordingly are the same as the nodes which are targeted by state retention mechanisms for supporting sleep modes. The reuse of the scan chain cells thus provides a reduced additional overhead in providing the present techniques.

The error detection codes may be provided in a variety of different ways. One form of error detection code well suited to the present techniques is a Hamming code.

In a similar way the error correction codes may take a variety of different forms and one particularly suitable form is that of cyclic redundancy check codes The state retention circuits in some embodiments may comprise one-bit latches distributed throughout the data processing circuitry. It would also be possible to locate the state retention circuits together within an area (e.g. provided with its own voltage domain or other physical properties reducing power during sleep mode) and linked by appropriate connections to the nodes from which the state values are being stored.

The present techniques of the sleep mode and the active mode with the state retention circuits subject to dynamic voltage control may be applied to the entirety of a data processing system. However, it will commonly be the case that only a portion of an apparatus will utilize the present techniques and other portions of the apparatus will not use this power saving technique.

The present technique is well suited to use in systems in which the apparatus is an integrated circuit.

The one or more supply voltage levels controlled in accordance with the present techniques may have a variety of different roles within the operation of the data processing apparatus. Examples of the supply voltage levels which may be controlled in accordance with the present technique include a supply rail voltage level, a ground rail voltage level, a body bias voltage level and a well voltage.

Viewed from another aspect, an apparatus for processing data comprises:

data processing means for performing data processing operations;

a plurality of state retention means coupled to said data processing circuitry for capturing and restoring respective state value from and to respective nodes within said data processing circuitry;

mode control means coupled data processing means and said plurality of state retention means to switch said apparatus between an active mode in which said data processing means performs data processing operations and a sleep mode in which said data processing means does not perform data processing operations and said plurality of state retention means store said state values captured from said data processing means upon entering said sleep mode, said mode control means controlling said data processing means and said plurality of state retention means such that upon exiting said sleep mode and returning to said active mode said state values are restored under hardware control to said respective nodes before, data processing by said data processing means is resumed;

error management means coupled to said plurality of state retention means and configured to detect one or more errors in retention of said state values and to trigger an error recovery response when said one or more errors are detected; and voltage control means coupled to said error management means for varying one or more supply voltage levels to said plurality of state retention circuits during said sleep mode so as to maintain a finite non-zero error rate in said retention of said state values.

Viewed from a further aspect, a method of reducing leakage power of an apparatus for processing data comprises the steps of:

performing data processing operations with data processing circuitry;

using a plurality of state retention means coupled to said data processing circuitry to capture and restore respective state value from and to respective nodes within said data processing circuitry;

switching between an active mode in which said data processing means performs data processing operations and a sleep mode in which said data processing means does not perform data processing operations and said plurality of state retention means store said state values captured from said data processing means upon entering said sleep mode, such that upon exiting said sleep mode and returning to said active mode said state values are restored under hardware control to said respective nodes before data processing by said data processing means is resumed;

detecting one or more errors in retention of said state values and triggering an error recovery response when said one or more errors are detected; and varying one or more supply voltage levels to said plurality of state retention circuits during said sleep mode so as to maintain a finite non-zero error rate in said retention of said state values.

The above, and other objects, features and advantages will be apparent from the following detailed description of illustrative embodiments which is to be read in connection with the accompanying drawings.

DESCRIPTION OF NON-LIMITING EXAMPLE EMBODIMENTS

Figure 1:
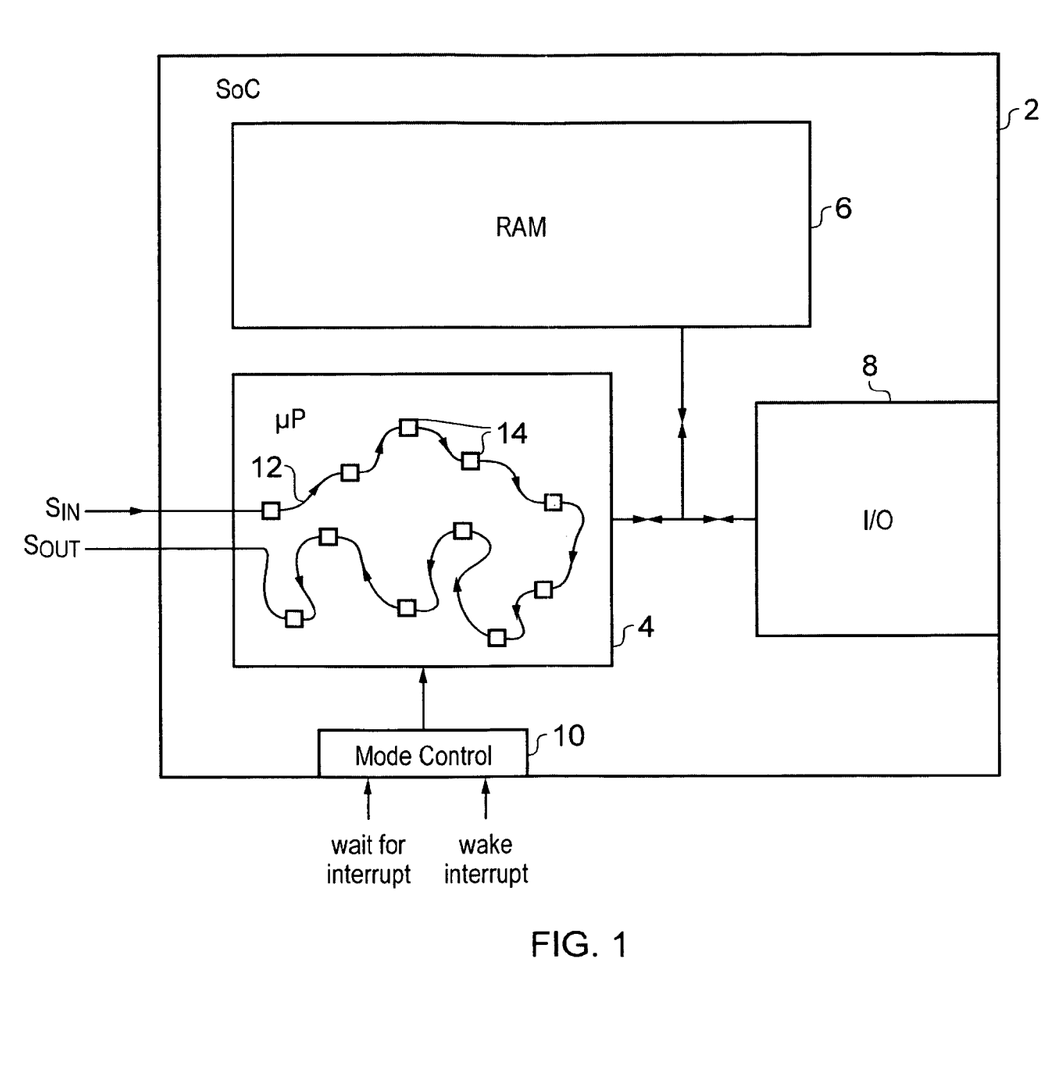
FIG. 1 schematically illustrates an integrated circuit including a portion that may be switched between a sleep mode and an active mode.

FIG. 1 illustrates an apparatus for processing data in the form of a system-on-chip integrated circuit 2. The integrated circuit 2 includes multiple circuit portions, such as a microprocessor 4, a random access memory 6 and input/output circuitry 8. A mode controller 10 is responsive to a wait-for-interrupt signal and a wake interrupt signal to switch the microprocessor 4 between a sleep mode and an active mode. It will be appreciated that the integrated circuit 2 may typically contain many further circuit elements and/or alternative circuit elements. In this example embodiment the microprocessor portion 4 is subject to switching between sleep mode and active mode whereas the random access memory 6 and the input/output circuitry 8 is not switched in this way.

It will be familiar to those in this technical field the microprocessor portion 4 may contain one or more serial scan chains 12 containing a plurality of serially connected scan chain cells 14. These scan chain cells can operate to both capture a signal value from a node within the microprocessor portion 4 and apply a signal value to a node within the microprocessor portion 4. Serial scan chain cells are often provided for diagnostic purposes, such as manufacturing test and/or debug. The mode controller 10 can utilize the scan chain cells 14 as state retention circuits when the microprocessor portion 4 is placed in sleep mode. Thus, when entering sleep mode the signal value at a node is captured and stored within a serial scan chain 14. When this capture and saving has taken place, the serial scan chain cell will remain powered during the sleep mode so as to retain the state value captured whereas the remaining circuit elements within the microprocessor portion 4 may be powered down so as to reduce power consumption, e.g. leakage power.

The wait-for-interrupt signal triggers the switch from an active mode into the sleep mode. When a wake interrupt signal is received by the mode controller 10, then this triggers the state values stored within the scan chain cells 14 to be written back to the respective associated nodes within the microprocessor portion 4 before processing by the microprocessor portion 4 is resumed. In this way, state values at critical nodes within the microprocessor portion 4 may be rapidly saved by the scan chain cells 10 and then restored from the scan chain cells 10 thereby supporting low latency switching between the sleep mode and the active mode. When the latency associated with this switching is low, the provision of the sleep mode becomes more useful as it is possible to invoke the sleep mode with a reduced penalty.

The scan chain cells 14 will themselves consume power and be subject to leakage currents. Operating the scan chain cells 14 at a lower voltage will reduce their power consumption. However, the lower the retention voltage used by the scan chain cells 14, the greater the likelihood of errors in the retention by the scan chain cells 14 of the state values, e.g. the scan chain cells 14 may become more susceptible to soft errors.

Figure 2:
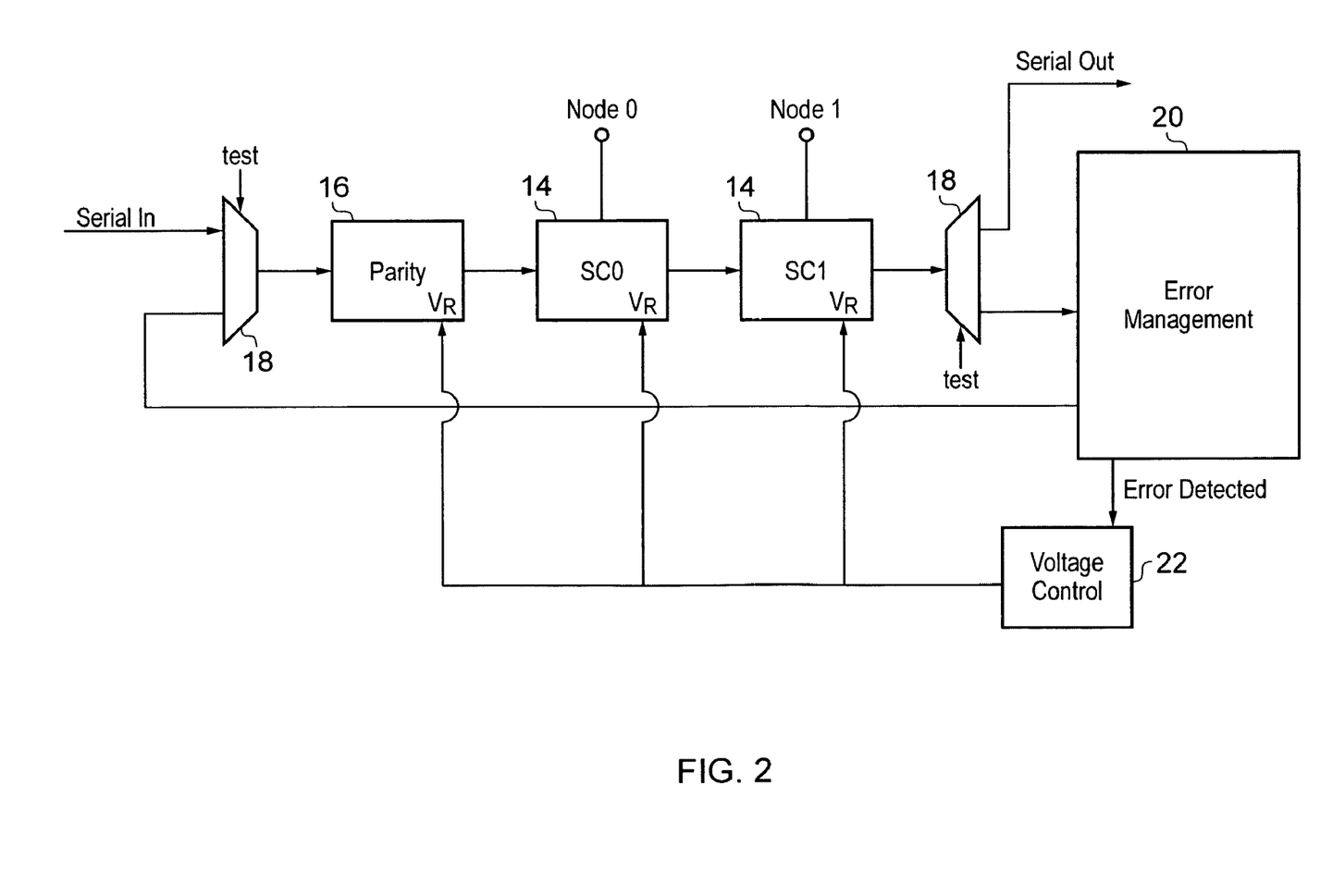
FIG. 2 schematically illustrates a scan chain formed of multiple scan chain cells with error management circuitry and a voltage controller for adjusting a retention voltage during a sleep mode.

FIG. 2 schematically illustrates a portion of a scan chain cell with error management circuitry 20 and a voltage controller 22. As will be seen, the scan chain cells 14 are connected to respective nodes from which they store state values when entering the sleep mode and to which they restore state values when returning to the active mode. Added to the scan chain cells 14 and in serial connection therewith is a parity cell 16. This parity cell 16 stores a parity bit indicating the parity of the state values held within the scan chain cells 14. Multiplexers 18 coupled to each end of the serial scan chain serve to connect this for its normal test/diagnostic operation or connect this in a recirculation fashion through the error management circuitry 20.

When entering sleep mode, state values are captured from the respective nodes within the microprocessor portion 4 by the scan chain cells 14. These state values are then recalculated around the scan chain cell through the error management circuitry 20. The error management circuitry 20 uses the state values as they propagate there through to calculate a parity bit value which is finally stored within the parity cell 16. This parity bit 16 provides an error detection code in respect of the state values stored within the scan chain cells 14.

Subsequent to the determination of the error detection code, the voltage controller 22 reduces the retention voltage $V_R$ supplied to the scan chain cells 14 and the parity cell 16. It will be appreciated that in this example the retention voltage is the supply rail voltage level. In other embodiments the voltage controlled by the voltage controller 22 could be a ground rail voltage, a body bias voltage, a rail voltage. It is also possible that combinations of these voltage levels could be controlled to reduce sleep mode power consumption. The voltage controller 22 adjusts the retention voltage so as to reduce the power consumed within the scan chain cells 14 and the parity cells 16 during the sleep mode.

When the wait interrupt signal is received by the mode controller 10, the voltage controller 22 serves to raise the retention voltage $V_R$ back to a level more normal during the active mode. This helps ensure that serial shifting of the state values through the interconnected scan chain cells 14 and parity cells 16 will be more robust. Before processing is resumed, the state values and the parity value are serially scanned around the scan chain through the error management circuitry 20 which again calculates a parity bit for the state values which have been returned from the scan chain cells 14 after the sleep mode operation and compares this parity value with the parity value stored within the parity cell 16. If the parity value matches, then a determination is made that the state values have been retained without error. If the parity value does not match, then this is detected as an error in retention of one of the state values by the scan chain cells 14. The detection of the error is reported by the error management circuitry 20 to the voltage controller 22. The voltage controller 22 uses the reported error rate to vary the retention voltage used during the sleep mode so as to maintain a finite non-zero error rate when retaining state values in the sleep mode.

It will be appreciated that the example of FIG. 2 is highly simplified in that there is only one serial scan chain and this contains only two scan chain cells 14. As will be familiar to those in this technical field, in practice many hundreds of serial scan chain cells 14 will be provided and multiple parity bits or other error detecting and/or error correcting codes may be provided. In particular, the scan chain cells can be at least logically arranged to form a two-dimensional array of state values being stored and Hamming codes and/or cyclic redundancy checking codes may be generated therefrom by the error management circuitry 20 to both detect and correct errors within the state values. In particular, errors may be detected and checked when switching back from the sleep mode to the active mode prior to resuming processing. If errors are detected, but these are too severe to be corrected by the stored error correcting codes, then a fall-back response may be triggered. Such a fall-back response may be slower in restoring proper operation, but will eventually result in correct operation. The voltage controller 22 will maintain the finite non-zero error rate within the state value retention with the aim of holding this at a level which can be corrected under hardware control as the state values are then restored under hardware control such that the switch from the sleep mode back to the active mode will be rapid. The need to trigger the fall-back response should be comparatively infrequent and accordingly the extra latency associated with the fall-back response may be tolerated.

US Published Patent Application US-A-2004-0153762 (the content of which is incorporated herein by reference) discloses a hardware driven state save/restore technique in a data processing system whereby data values are captured in scan chains and saved off to a memory. The data values can then be restored from the memory back to the scan chains. This save and restore operation may also be performed under software control. Whilst the restore operation using this fall-back technique is slower than directly restoring the state values held within the scan chain cells 14 to the nodes, it is likely to be more robust as the state values may be held within a memory, such as random access memory 6, which has its power supply maintained securely throughout the sleep mode. The memory will be separate from the state retention circuits. Furthermore, it will be appreciated that whilst saving state values to this separate memory may be slow when entering the sleep mode from the active mode so as to provide the fall-back option of restoring those state values saved within memory, in practice the fall-back option will rarely be needed. Furthermore, it is normally the case that a user's perception of performance is more influenced by how quickly data processing resumes rather than how quickly data processing enters the sleep mode. The sleep mode will generally be entered when little processing activity is required and accordingly there is no particular pressure to enter the sleep mode quickly. Conversely, when exiting the sleep mode and resuming the active mode, this may often be because data processing is now required and a delay in this resumption of processing will be adversely perceived. The hardware control of the restore when no errors, or only hardware correctable errors are present, within the state values stored within the scan chain cells 14 enables a rapid resume to be achieved without the need to read back data values from memory. Furthermore, the energy associated with reading those data values may be saved.

Figure 3:
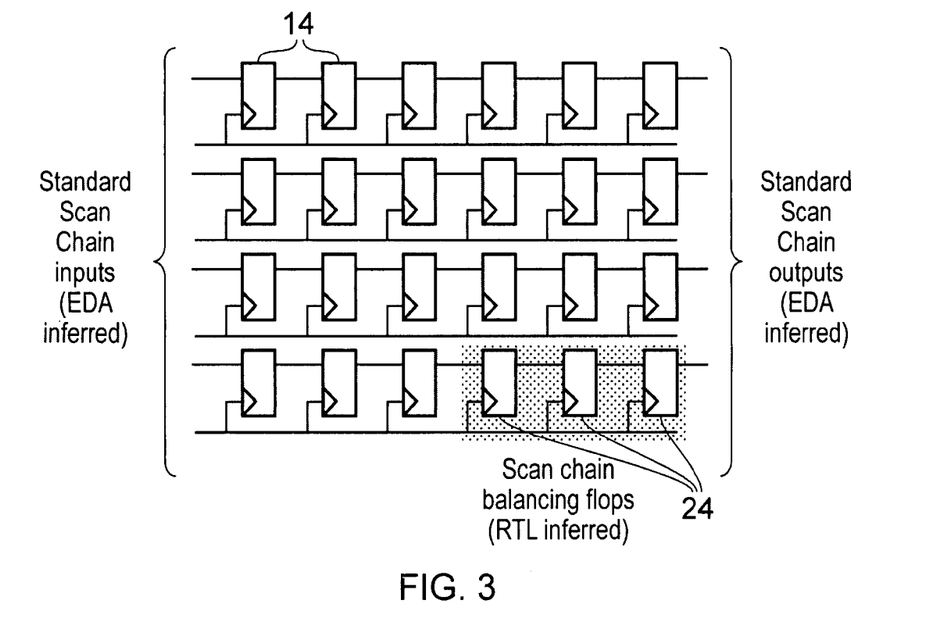
FIG. 3 schematically illustrates scan chain cells which are provided within an integrated circuit for diagnostic purposes being grouped for use with the state value retention mechanisms of the present technique.

FIG. 3 schematically illustrates a plurality of scan chain cells 14 which may typically be provided within an integrated circuit 2. These scan chain cells 14 are typically form part long scan chain cells for test/diagnostic purposes. Such serial scan chains may typically contain many hundreds or thousands of scan chain cells. For the purposes of the present technique where rapid error detection/correction code generation and rapid error detection/correction operation are required, it is desirable to divide the scan chain cells 14 into shorter serial scan chains (at least for the purposes of save and restore). In this way, with shorter serial scan chains the state values can be recirculated through the serial scan chain more rapidly. Thus, the scan chain cells 14 may be connected into long serial scan chains for test and diagnostic purposes and then divided (in terms of signal path) into shorter serial scan chains with appropriate multiplexers for the purposes of state value save and restore in accordance with the present techniques.

FIG. 3 illustrates how a plurality of scan chain cells 14 may be divided into four serial scan chains each containing six scan chain cells 14. In practice the number of scan chain cells 14 may not evenly divide into a number of serial scan chains each containing the same number of scan chain cells (14). In this case, balancing serial scan chain cells 24 (with tied node state values) may be added such that each of the scan chains for the purposes of the save and restore contains the same number of state values which are to be recirculated and from which error detecting/correcting codes are to be generated and later used.

Figure 4:
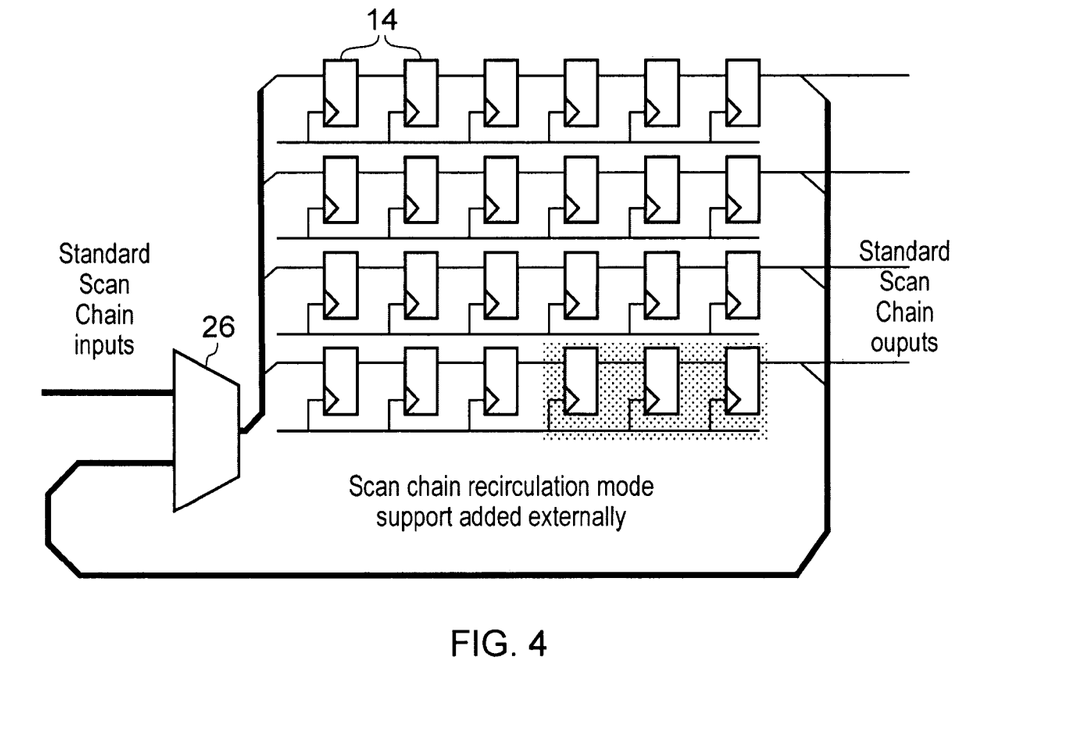
FIG. 4 schematically illustrates the state retention circuits connected to form a plurality of recirculation scan cell chains.

FIG. 4 illustrates how the serial scan chain cells 14 of FIG. 3 may be connected via an appropriate multi-bit wide multiplexer 26 into a recirculating configuration whereby recirculating scan chains are formed with the error management circuitry 20 coupled to such a plurality of recirculating scan chains. In this way recirculation of state values around the recirculating scan chains permits the error management circuitry to read the state values and detect any errors therein, generate error detecting codes, generate error correcting codes, correct state values or perform other functions upon the state values as they pass through the error management circuitry 20.

Figure 5:
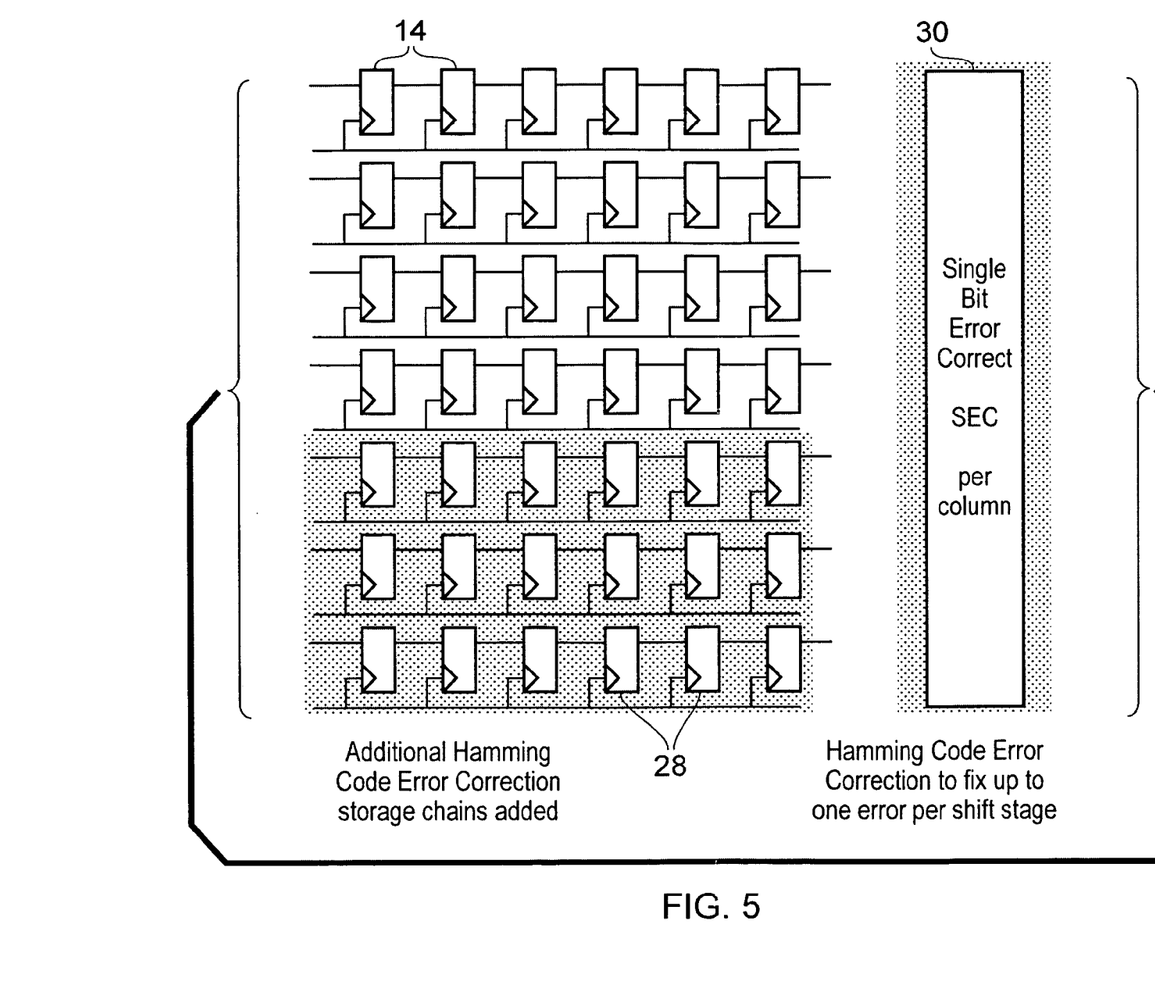
FIG. 5 schematically illustrates the addition of Hamming codes to the state values stored within the state retention circuits.

FIG. 5 schematically illustrates the scan chain cells 14 of FIG. 4 but with the addition of error detection/correcting cells 28 storing error detecting codes and/or error correcting codes to be used by single bit error correction circuitry 30 within the error management circuitry 20. In this example embodiment, Hamming code error correction/detection codes are added to each column of the scan chain cells 14. Thus, the single bit error correction circuitry 30 is able to detect and correct a single bit error within any column of scan chain cells 14 as they are shifted through the single bit error correction circuitry 30 during the recirculation of the state values prior to restarting the active mode. If a column of scan chain cells 14 contains more than one error in the retention of the state value as detected by the Hamming code, then error correction by this mechanism is not possible and a fall-back response as previously discussed will be triggered. The fall-back response may be reading the state values which were saved off to memory back into the scan chain cells 14 (this being a relatively slow process) or potentially resetting the integrated circuit 2 or at least the microprocessor portion 4 of the integrated circuit 2.

Figure 6:
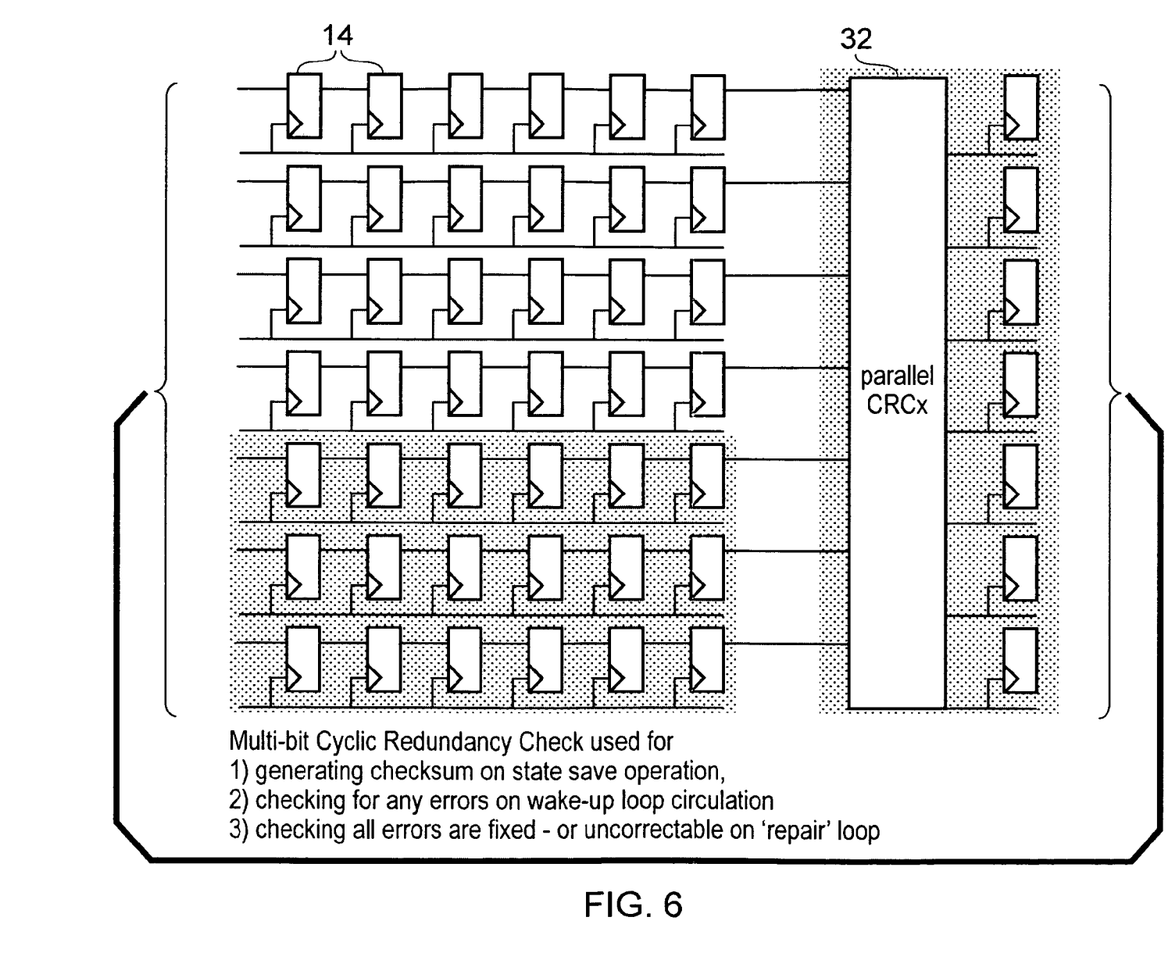
FIG. 6 schematically illustrates the further addition of cyclic redundancy check codes to the system illustrated in FIG. 5.

FIG. 6 schematically illustrates a further modification of the arrangement of the scan chain cells 14 of FIG. 5. In this example, cyclic redundancy check codes have been used and the error management circuitry 20 includes cyclic redundancy check circuit 32 for detecting and correcting errors within the state value stored within the scan chain cells 14. The use of Hamming codes and cyclic redundancy check codes in the way illustrated in FIGS. 5 and 6 for the detection and correction of errors within arrays of bit values will be familiar to those in this technical field. In particular, such error detection and correction techniques are frequency used in association with the detection and correction of errors within two dimensional arrays of video data and the like. It is possible that other error detection/correction techniques may be employed in addition or as alternatives to the Hamming codes and the cyclic redundancy check codes discussed above.

Figure 7:
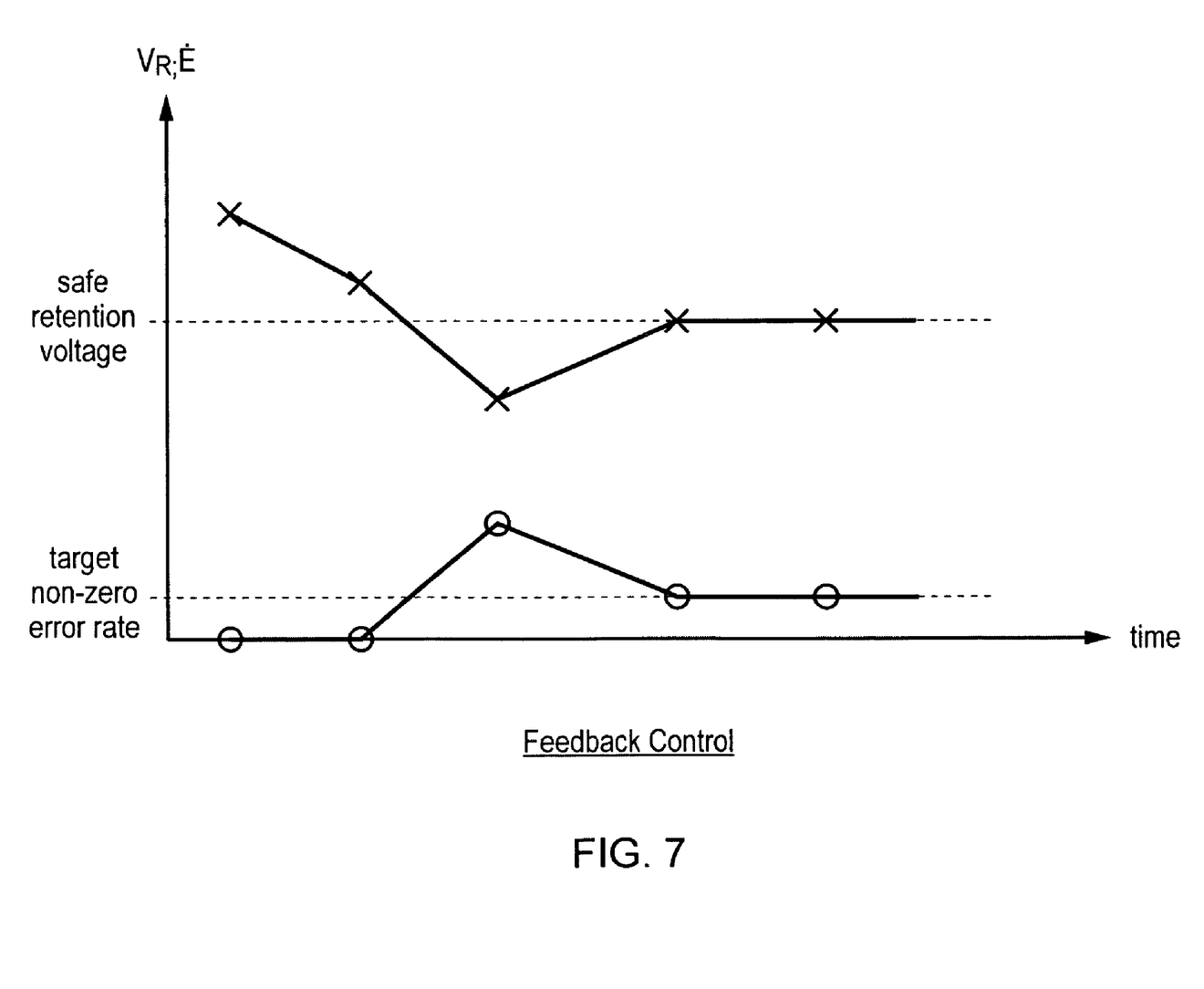
FIG. 7 schematically illustrates the variation in retention voltage with detected error rate so as to maintain a finite non-zero error rate.

FIG. 7 schematically illustrates how the voltage controller 22 of FIG. 2 may respond to the detected error rate supplied from the error management circuitry 20 in controlling the retention voltage $V_R$. In particular, in the example illustrated in FIG. 7 the first two times that the stored state values are subject to error detection, no errors are detected therein. This is indicative of the retention voltage $V_R$ being too high and needlessly wasting power during sleep mode. In response to the indication of zero errors being detected, which is below the finite non-zero error rate which is the target of the voltage controller 22, the voltage controller 22 lowers the retention voltage $V_R$ to be used during the next sleep mode period. In the example illustrated, it will be seen that in the third sample the retention voltage has been reduced too far and the error rate has risen above the target non-zero error rate. The errors may be correctable using the Hamming codes and the cyclic redundancy check codes previously discussed, or alternatively may need to be corrected by the fall-back mechanism such as reading safe values from memory or a system reset As the retention voltage $V_R$ has been reduced too far, in the fourth period the retention voltage $V_R$ to be used is raised slightly and the result is that the error rate detected matches the target non-zero error rate which is the aim of the voltage controller 22. As an example, the voltage controller 22 may serve to reduce the retention voltage $V_R$ until there is a single bit error within the state value stored within each column of scan chain cells 14. This situation will indicate that the retention voltage can be reduced no further without risking the need to rely upon the fall-back error recovery mechanism too often. The occurrence of soft errors is an at least partially random process and the voltage controller 22 will be able to track the behaviour of the integrated circuit 2 as it varies its operating and environmental conditions. As an example, it may be that if the integrated circuit 22 is operating in a hot environment, then retention of the state values may be more error prone and accordingly a higher retention voltage is required. The voltage controller 22 is able to dynamically adjust the retention voltage whilst maintaining the non-zero error rate characteristic of being close to the limit of the retention voltage which may be employed without risking catastrophic errors in the retention of the state values. The voltage controller 22 may adjust the retention voltage $V_R$ using a technique such as that described in copending U.S. application Ser. No. 11/979,541 (the content of which is incorporated herein in its entirety by reference). Other voltage adjusting techniques may also be used.

Figure 8:
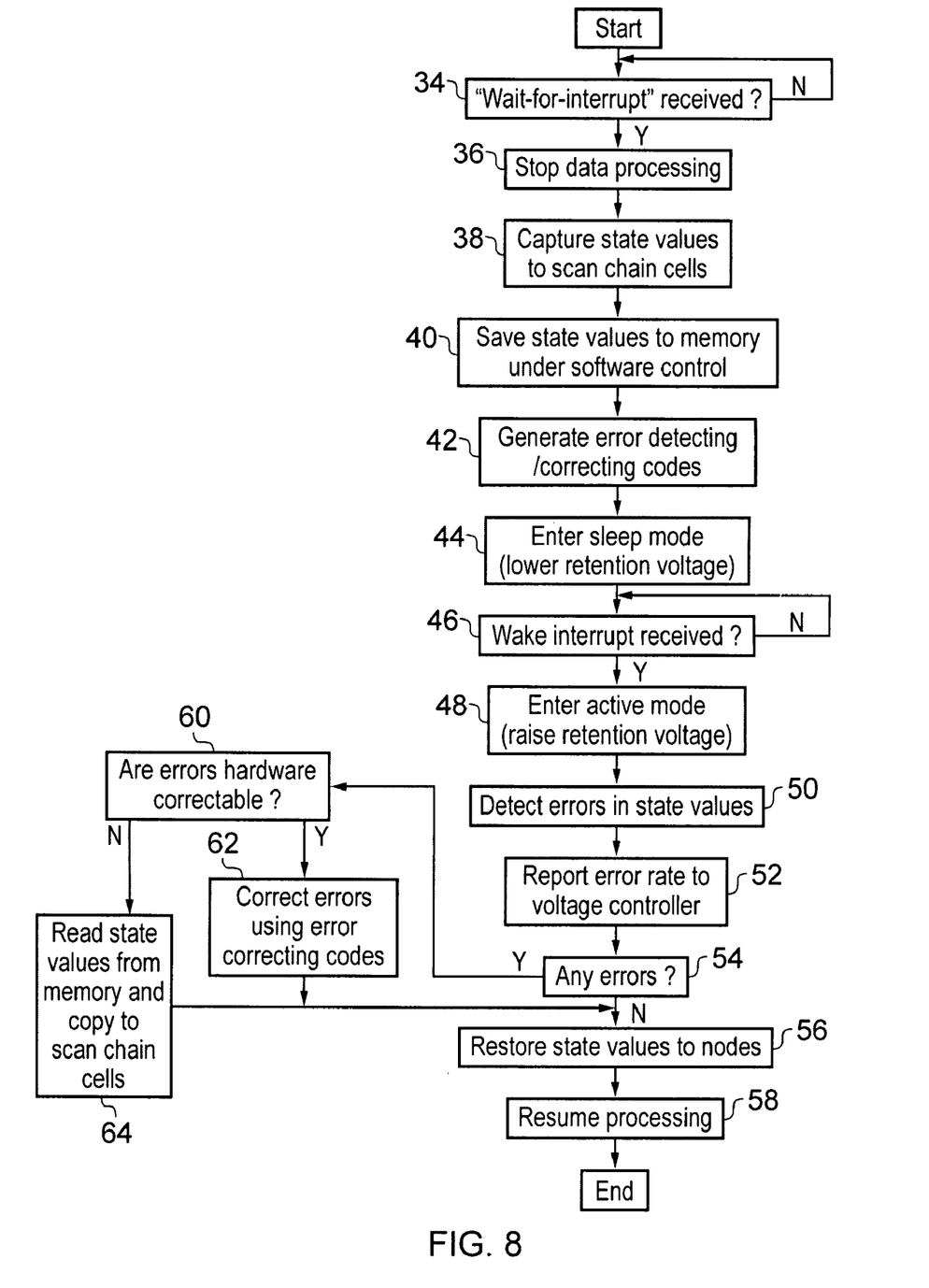
FIG. 8 is a flow diagram schematically illustrating the operation of the integrated circuit in switching between sleep mode and active mode.

FIG. 8 is a flow diagram schematically illustrating the process of switching from the sleep mode to the active mode and then returning from the sleep mode to the active mode. At step 34 the processing waits for a wait-for-interrupt signal to be received. A wait-for-interrupt signal corresponds to a sleep request which when followed and a sleep mode entered will place the system in a sleep state that is exited when an interrupt is received. When such a signal is received, then step 36 stops the data processing being performed by the microprocessor portion 4. It will be appreciated that other data processing circuits, such as digital signal processing circuits, memory circuits, input/output circuits and the like, may be used with the present technique and the stopping of the data processing at step 36 corresponds to stopping of their normal activity with the necessary state values being saved as will be described in the subsequent steps.

At step 38, the state values at the nodes within the processing circuitry which will be needed to resume processing when the active mode is re-entered are captured into the scan chain cells. At step 40 the captured state values are saved out to memory under software control (such as to memory 6 of FIG. 1). This provides a fall-back error recovery mechanism should this be At step 42 the state values are recirculated through the recirculating scan chains illustrated in FIGS. 4, 5 and 6 so as to generate the error detecting/correcting codes associated with the state values. At step 44 the sleep mode is entered and the retention voltage $V_R$ is lowered. At step 46 the system waits for a wake interrupt signal to be received.

When the mode controller 10 receives the wake interrupt signal, then processing proceeds to step 48 at which the active mode is re-entered with a raising of the retention voltage $V_R$. Step 50 then detects any errors in the state values stored within the scan chain cells 14. This detection may be by recirculating the state values around their recirculating scan chains through the error management circuitry 20 and comparison with the error detecting/correcting codes previously generated and stored. At step 52, the detected error rate is reported to the voltage controller 22 for use in adjusting the retention voltage when the sleep mode is re-entered.

At step 54 a determination is made as to whether or not any errors were detected in the retention of the state values. If no errors were detected, then processing proceeds to step 56 at which the state values are restored to their respective nodes before processing resumes at step 58.

If errors were detected at step 54, then step 60 determines whether or not the errors are hardware correctable. Typically this will correspond to the errors not being too great in number and not being clustered too closely together such that the stored error detecting/correcting codes are able to correct the errors. If the errors are hardware correctable, then hardware correction is performed at step 62 prior to processing proceeding to step 56. If the errors are not hardware correctable, then step 64 performs the fall-back error response, such as reading state values from the memory 6 and copying these into the scan chain cells before processing proceeds to step 56.

Figure 9:
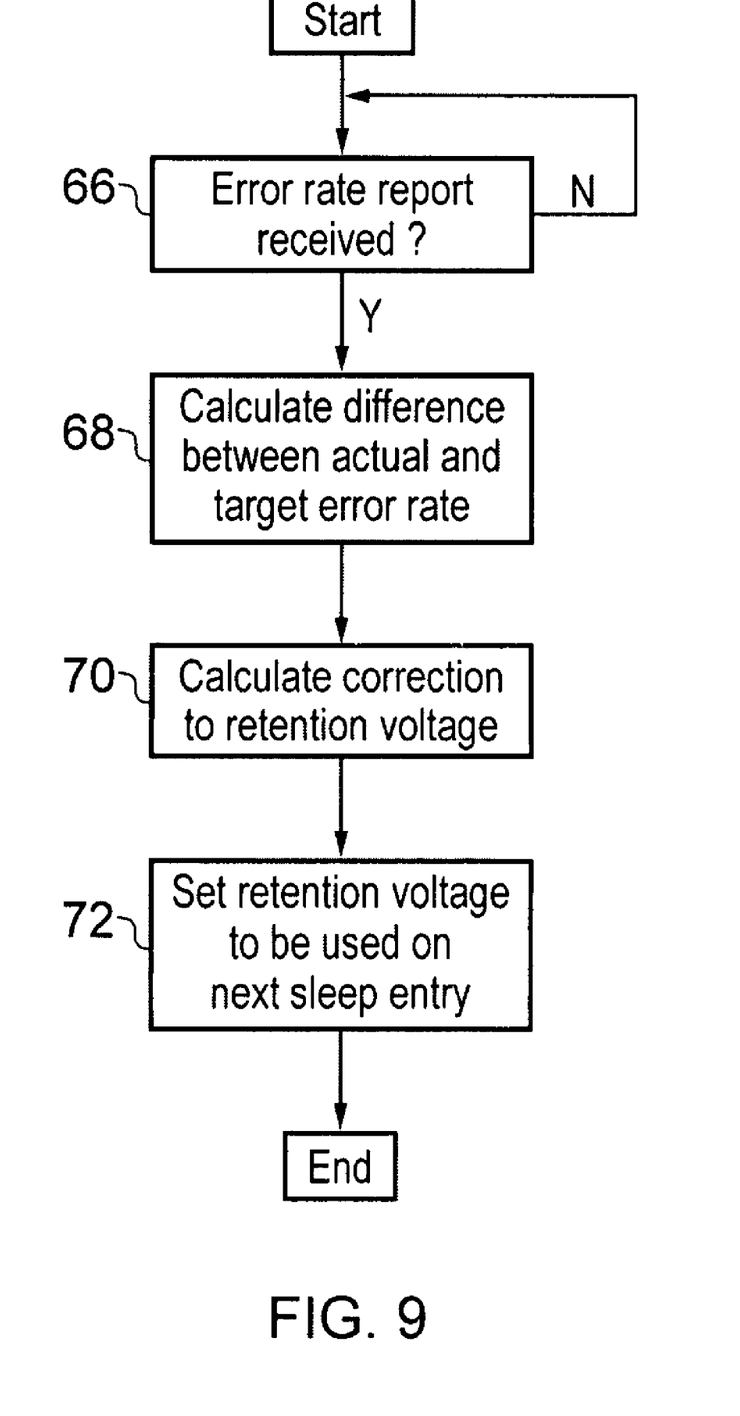
FIG. 9 is a flow diagram schematically illustrating operation of the voltage controller in setting the retention voltage in dependence upon the detected error rate.

FIG. 9 schematically illustrates the operation of the voltage controller 22. At step 66 the voltage controller waits for an error rate report to be received from the error management circuit 20. When such an error rate report is received, step 68 calculates the difference between the actual error rate observed and the target finite non-zero error rate which the voltage controller 22 is seeking to maintain. Step 70 then calculates a correction to the retention voltage $V_R$ compared to that previously used which gave rise to the error rate reported at step 66. Step 70 then sets the retention voltage $V_R$ to be used at the next sleep mode entry. Operating in accordance with the process of FIG. 9, the retention voltage may be adjusted in accordance with the principals of feedback control illustrated in FIG. 7 to maintain a target finite non-zero error rate. The retention voltage adjusted may be the supply rail voltage, the ground voltage, the body bias, the well voltage or another voltage or combination of voltages which has an influence over the power consumption of the scan chain cells 14 during the sleep mode.

Figure 10:
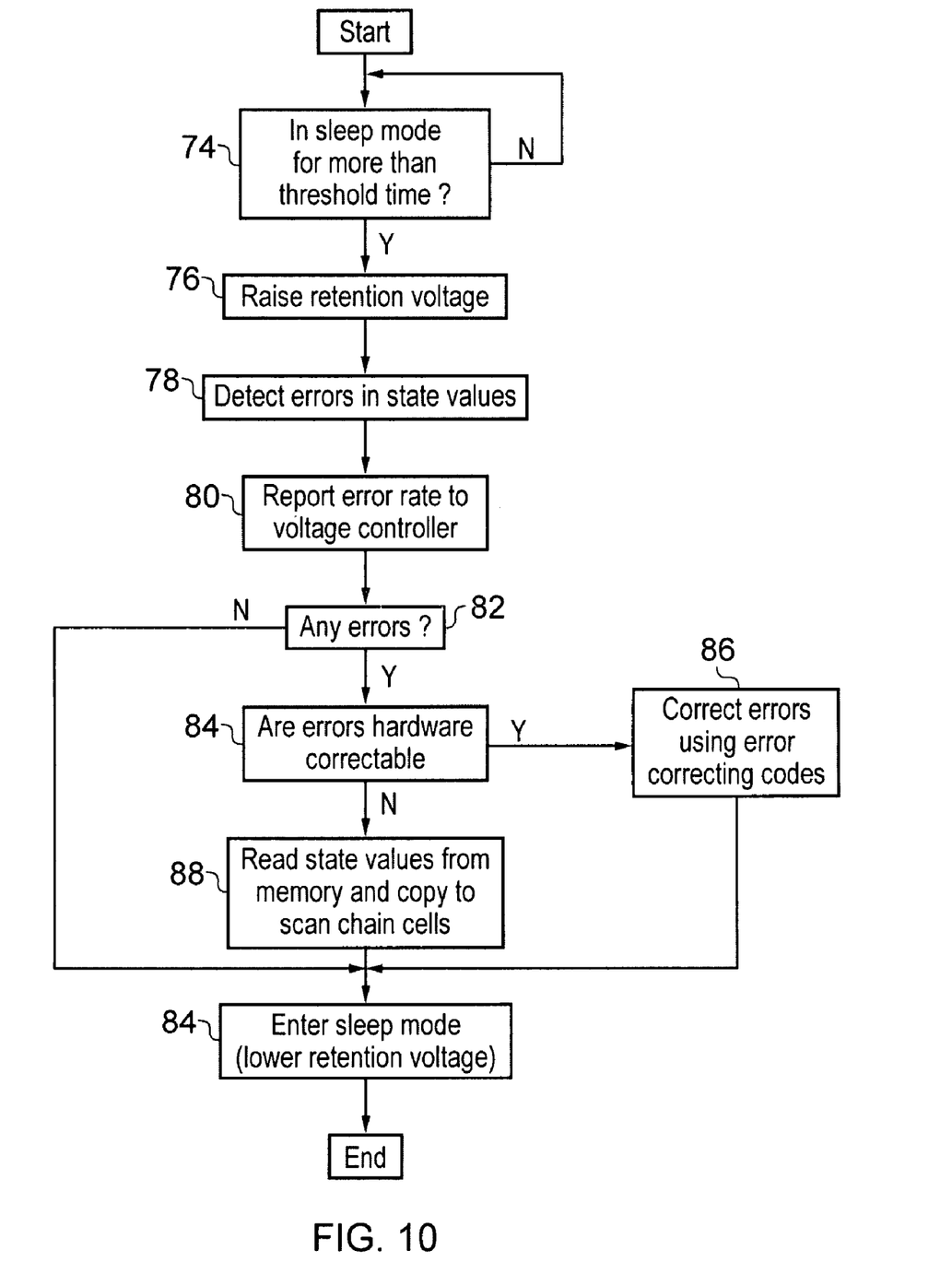
FIG. 10 is a flow diagram schematically illustrating the periodic detection and correction of errors during sleep mode.

FIG. 10 illustrates an alternative and/or additional series of operations that may be performed to detect and correct errors during the sleep mode without a return being made to the active mode. Such behaviour may be advantageous as a way of preventing the gradual build up of soft errors within the state values so that these do not go beyond the point at which they can be detected and corrected by the error detection/connection codes held within the hardware.

At step 74 a determination is made as to whether or not the sleep mode has been active for more than a threshold length of time since the last detection and correction operation was performed. When the sleep mode has been active for more than this threshold length of time, processing proceeds to step 76 at which the retention voltage $V_R$ is raised. Step 78 then serves to detect any errors in the state values as they are recirculated through the recirculating scan chains. Step 80 reports the detected error rate to the voltage controller 22 in order to provide information upon which the feedback controlled by the voltage controller 22 may be achieved.

Step 82 determines whether or not any errors have been detected. If no errors have been detected, then processing proceeds to step 84 where the sleep mode is re-entered and the retention voltage $V_R$ is lowered. If errors are detected, then step 84 determines whether or not these are hardware correctable. If these errors are hardware correctable, then processing proceeds to step 86 where the error detection/correcting codes are used to correct the detected errors. If the errors are not hardware correctable, then processing proceeds to step 88 where the fallback response is invoked, such as reading the state values from the memory 6 and copying these back to the scan chain cells 14. Invoking the fallback response at this time may be advantageous as it will reduce the latency of returning to the active mode when this is actually required by processing to be performed.

Although illustrative example embodiments have been described in detail herein with reference to the accompanying drawings, it is to be understood that the claims are not limited to those precise embodiments, and that various changes and modifications can be effected therein by one skilled in the art without departing from the scope and spirit of the appended claims.

I claim:

1. Apparatus for processing data comprising:
data processing circuitry configured to perform data processing operations;
a plurality of state retention circuits coupled to said data processing circuitry to capture and restore respective state values from and to respective nodes within said data processing circuitry;
a mode controller coupled data processing circuitry and said plurality of state retention circuits to switch said apparatus between an active mode in which said data processing circuitry performs data processing operations and a sleep mode in which said data processing circuitry does not perform data processing operations,
said plurality of state retention circuits being configured to store said state values captured from said data processing circuitry upon entering said sleep mode,
said mode controller being configured to control said data processing circuitry and said plurality of state retention circuits such that upon exiting said sleep mode and returning to said active mode said state values are restored under hardware control to said respective nodes before data processing by said data processing circuitry is resumed;
error management circuitry coupled to said plurality of state retention circuits and configured to detect one or more errors in retention of said state values and to trigger an error recovery response when said one or more errors are detected; and
a voltage controller coupled to said error management circuitry and configured to vary one or more supply voltage levels to said plurality of state retention circuits during said sleep mode so as to maintain a finite non-zero error rate in said retention of said state values.

2. Apparatus as claimed in claim 1, wherein said error management circuitry is configured to generate one or more error detection codes from said state values stored in said plurality of state retention circuits.

3. Apparatus as claimed in claim 2, wherein said error detection codes are generated upon switching from said active mode to said sleep mode and said error management circuitry is configured to use said error detection codes to detect said one or more errors upon switching from said sleep mode to said active mode.

4. Apparatus as claimed in claim 2, where in said error detection codes are generated upon switching from said active mode to said sleep mode and said error management circuitry is configured to use said error detection codes to detect said one or more errors while remaining in said sleep mode.

5. Apparatus as claimed in claim 1, wherein said error management circuitry is configured to generate one or more error correction codes from said state values stored in said plurality of state retention circuits and said error recovery response is configured to use said one or more error correction codes to correct said one or more errors in said state values.

6. Apparatus as claimed in claim 5, wherein said error correction codes are generated upon switching from said active mode to said sleep mode and said error management circuitry uses said error correction codes to correct said one or more errors upon switching from said sleep mode to said active mode.

7. Apparatus as claimed in claim 1, wherein said error recovery response includes detecting when said one or more errors in said state value stored in said plurality of state retention circuits are unrecoverable and triggering a fall-back response.

8. Apparatus as claimed in claim 7, wherein upon entering said sleep mode, said mode controller is configured to trigger storage of said state values to a memory and said fall-back response comprises reading said state values from said memory and restoring said state values read from said memory to said nodes.

9. Apparatus as claimed in claim 8, wherein storage of said state values to said memory and reading said state values from said memory are performed under software control.

10. Apparatus as claimed in claim 7, wherein said fall-back response is an at least partial reset of said apparatus.

11. Apparatus as claimed in claim 1, wherein said mode controller is responsive to a wait-for-interrupt signal to trigger a switch from said active mode to said sleep mode.

12. Apparatus as claimed in claim 11, wherein said mode controller is responsive to a wake interrupt signal to trigger a switch from said sleep mode to said active mode.

13. Apparatus as claimed in claim 1, wherein said plurality of state retention circuits comprise scan chain cells providing a portion of diagnostic mechanism for said apparatus.

14. Apparatus as claimed in claim 1, wherein said plurality of state retention circuits comprise scan chain cells connected to form a plurality of recirculating scan chains and said error management circuitry is coupled to said plurality of recirculating scan chains such that recirculation of said state values around said recirculating scan chains permits said error management circuitry to read said state values and detect said one or more errors.

15. Apparatus as claimed in claim 2, wherein said one or more error detection codes are Hamming codes.

16. Apparatus as claimed in claim 5, wherein said one or more error correction codes are cyclic redundancy check codes.

17. Apparatus as claimed in claim 1, wherein said plurality of state retention circuits comprise one-bit latches distributed through said data processing circuitry.

18. Apparatus as claimed in claim 1, comprising one or more further data processing circuits without state retention circuits storing state values.

19. Apparatus as claimed in claim 1, wherein said apparatus is an integrated circuit.

20. Apparatus as claimed in claim 1, wherein said one or more supply voltage levels comprise one or more of:
- a supply rail voltage level;
- a ground rail voltage level;
- a body bias voltage level; and
- a well voltage.

21. Apparatus for processing data comprising:
- data processing means for performing data processing operations;
- a plurality of state retention means coupled to said data processing circuitry for capturing and restoring respective state value from and to respective nodes within said data processing circuitry;
- mode control means coupled data processing means and said plurality of state retention means to switch said apparatus between an active mode in which said data processing means performs data processing operations and a sleep mode in which said data processing means does not perform data processing operations and said plurality of state retention means store said state values captured from said data processing means upon entering said sleep mode, said mode control means controlling said data processing means and said plurality of state retention means such that upon exiting said sleep mode and returning to said active mode said state values are restored under hardware control to said respective nodes before data processing by said data processing means is resumed;
- error management means coupled to said plurality of state retention means and configured to detect one or more errors in retention of said state values and to trigger an error recovery response when said one or more errors are detected; and
- voltage control means coupled to said error management means for varying one or more supply voltage levels to said plurality of state retention circuits during said sleep mode so as to maintain a finite non-zero error rate in said retention of said state values.

22. A method of reducing leakage power of an apparatus for processing data, said method comprising the steps of:
- performing data processing operations with data processing circuitry;
- using a plurality of state retention circuits coupled to said data processing circuitry to capture and restore respective state value from and to respective nodes within said data processing circuitry;
- switching between an active mode in which said data processing circuitry performs data processing operations and a sleep mode in which said data processing circuitry does not perform data processing operations and said plurality of state retention circuits store said state values captured from said data processing circuit upon entering said sleep mode, such that upon exiting said sleep mode and returning to said active mode said state values are restored under hardware control to said respective nodes before data processing by said data processing circuitry is resumed;
- detecting one or more errors in retention of said state values and triggering an error recovery response when said one or more errors are detected; and
- varying one or more supply voltage levels to said plurality of state retention circuits during said sleep mode so as to maintain a finite non-zero error rate in said retention of said state values.

* * * * *